US009024604B2

(12) United States Patent
Oki

(10) Patent No.: US 9,024,604 B2
(45) Date of Patent: May 5, 2015

(54) POWER CIRCUIT

(71) Applicant: Fujitsu Semiconductor Limited, Yokohama-shi, Kanagawa (JP)

(72) Inventor: Hideta Oki, Kawasaki (JP)

(73) Assignee: Fujitsu Semiconductor Limited, Yokohama (JP)

( * ) Notice: Subject to any disclaimer, the term of this patent is extended or adjusted under 35 U.S.C. 154(b) by 177 days.

(21) Appl. No.: 13/852,722

(22) Filed: Mar. 28, 2013

(65) Prior Publication Data

US 2013/0279219 A1 Oct. 24, 2013

(30) Foreign Application Priority Data

Apr. 24, 2012 (JP) ................................ 2012-098510

(51) Int. Cl.

| | |
|---|---|
| ***G05F 1/00*** | (2006.01) |
| ***H02M 5/42*** | (2006.01) |
| ***H02M 7/04*** | (2006.01) |
| ***H02M 7/68*** | (2006.01) |
| ***H02H 7/125*** | (2006.01) |
| ***H02H 7/12*** | (2006.01) |
| ***H02M 1/32*** | (2007.01) |
| ***H02M 3/158*** | (2006.01) |
| *H02M 1/00* | (2006.01) |

(52) U.S. Cl.

CPC ........... *H02H 7/1252* (2013.01); *H02H 7/1213* (2013.01); *H02M 1/32* (2013.01); *H02M 3/158* (2013.01); *H02M 2001/009* (2013.01)

(58) Field of Classification Search

USPC ......... 323/282, 283, 284, 285, 286, 287, 288; 363/89, 97

See application file for complete search history.

(56) References Cited

U.S. PATENT DOCUMENTS

| | | | | |
|---|---|---|---|---|
| 2001/0030528 | A1* | 10/2001 | Ootani | 323/272 |
| 2007/0182390 | A1* | 8/2007 | Ishii et al. | 323/282 |
| 2010/0072967 | A1* | 3/2010 | Kamishinbara et al. | 323/284 |
| 2010/0123978 | A1* | 5/2010 | Lin et al. | 361/18 |
| 2013/0162235 | A1* | 6/2013 | Harada | 323/283 |

FOREIGN PATENT DOCUMENTS

| | | | |
|---|---|---|---|
| JP | 10-322934 | A | 12/1998 |
| JP | 2000-308352 | A | 11/2000 |
| JP | 2005-006398 | A | 1/2005 |

* cited by examiner

*Primary Examiner* — Jue Zhang
*Assistant Examiner* — Lakaisha Jackson
(74) *Attorney, Agent, or Firm* — Arent Fox LLP

(57) ABSTRACT

A power circuit includes a first and a second switches between a input terminal and a reference power source; an inductor between a output terminal and a node between the first and the second switches, a main capacitor coupled to the output terminal, a main switch between the inductor and the output terminal, a sub capacitor coupled to a node between the inductor and the main switch through a sub switch, and a control circuit. And the control circuit performs: switching operation of the first and the second switches, and suspension operation that maintains an off-state of the first and the second switches after switching operation; the switching operation on the main capacitor by switching on the main switch; the switching operation on the sub capacitor by switching on the sub switch; and the switching operation by switching on the main switch and the sub switch.

7 Claims, 9 Drawing Sheets

10 20 PZ1 PZ2 e I0 VIN N1 ISH C0 OVERVOLTAGE PROTECTION CIRCUIT 21 VS- VOUT- 22 SWITCHING CONTROL CIRCUIT SW1 QH LX N3 L IL VS SW3 N4 VOUT N2 14 LOAD CIRCUIT SW2 QL G1 C1 LDO PFM SS OVP OUTPUT DESTINATION SWITCH CIRCUIT 23 G2 SW4 C2 VOUT VS 10
e
PZ1
PZ2
I0
11
VIN
NA
CA
OVERVOLTAGE PROTECTION CIRCUIT
12
ISH
VOUT
SWITCHING CONTROL CIRCUIT
13
SWA
NC
ILA
LA
SWB
CB
VOUT
NB
LOAD CIRCUIT
14
RELATED ART

RELATED ART

LOAD CIRCUIT
14
20
10
VOUT
N2
C1
SW3
G1
VS
N4
SW4
C2
L
IL
LX
SW2
SW1
N3
QH
QL
G2
SWITCHING CONTROL CIRCUIT
OUTPUT DESTINATION SWITCH CIRCUIT
SS
PFM
LDO
VS
VOUT
22
23
ISH
OVERVOLT-AGE PROTEC-TION CIRCUIT
21
OVP
VIN
N1
I0
C0
PZ1
PZ2
e

FIG. 5

| | SS | PG | OVP | PFM | PFM_Q | OVP_Q | ENB | Q | OR | G1 | G2 |
|---|---|---|---|---|---|---|---|---|---|---|---|
| A | 1 | X | 0 | 0 | 0 | 0 | 0 | 0 | 0 | 0 | 1 |
| B | 1 | X | 0 | 1 | 1 | 0 | 0 | 0 | 0 | 0 | 1 |
| C | 1 | X | 1 | 0 | 0 | 1 | 0 | 0 | 0 | 0 | 1 |
| D | 1 | X | 1 | 1 | 1 | 1 | 1 | 0 | 1 | 1 | 0 |
| E | 0 | 0 | 0 | 0 | 1 | 1 | 1 | 0 | 1 | 1 | 0 |
| F | 0 | 0 | 0 | 1 | 1 | 0 | 0 | 0 | 0 | 0 | 1 |
| G | 0 | 0 | 1 | 0 | 1 | 1 | 1 | 0 | 1 | 1 | 0 |
| H | 0 | 0 | 1 | 1 | 1 | 1 | 1 | 0 | 1 | 1 | 0 |
| I | 0 | 1 | 1 | 1 | 1 | 1 | 1 | 1 | 1 | 0 | 0 |
| J | 0 | 1 | 0 | 0 | 1 | 0 | 0 | 1 | 1 | 0 | 0 |
| K | 0 | 1 | 0 | 1 | 1 | 0 | 0 | 1 | 1 | 0 | 0 |
| L | 0 | 1 | 1 | 0 | 1 | 0 | 0 | 1 | 1 | 0 | 0 |

10
e
PZ1
PZ2
30
I0
N1
C0
VIN
OVERVOLT-
AGE PROTEC-
TION CIRCUIT
31
ISH
VS
VOUT
OVP
SWITCHING
CONTROL
CIRCUIT
32
SS
PFM
LDO
OUTPUT
DESTINATION
SWITCH CIRCUIT
33
VS
VOUT
SW1
QH
N3
SW2
QL
LX
IL
L
VS
N4
SW3
G1
SW4
G2
C2
SW5
G3
C3
C1
VOUT
N2
14
LOAD
CIRCUIT

POWER CIRCUIT

CROSS-REFERENCE TO RELATED APPLICATION

This application is based upon and claims the benefit of priority of the prior Japanese Patent Application No. 2012-98510, filed on Apr. 24, 2012, the entire contents of which are incorporated herein by reference.

FIELD

The present invention relates to a power circuit.

BACKGROUND

Energy harvesting recently attracting attention is a power generation technology by collecting micro energy in our surroundings, which is discarded without usage, from heat, vibration, electromagnetic waves, etc. For example, vibration power generation that generates power by applying distortion to a piezoelectric device and radio wave power generation that converts radio waves in the environments into electric power by an antenna are listed. To supply electric energy generated by energy harvesting to a load circuit, an AC-DC converter is used to generate a DC output voltage of desired potential from an AC power source generated by the energy harvesting.

For example, the AC-DC converter includes a power circuit such as a DC-DC converter and a rectifier circuit. First, the rectifier circuit rectifies an AC voltage of the AC power source to a DC voltage. Then, the power circuit such as the DC-DC converter generates an output voltage of desired potential from the above DC potential.

If the output voltage reaches the desired potential, the AC voltage continues to be supplied to the AC-DC converter, as long as the AC power source continues to generate power. As a result, the DC voltage input from the rectifier circuit to the power circuit continues to increase, and produces an overvoltage state. To prevent this, an overvoltage protection circuit is provided in the power circuit, so that the DC voltage input to the power circuit is clamped to a predetermined voltage.

Followings are related prior arts.

The official gazette of the Japanese Laid-open Patent Publication No. 2000-308352.

The official gazette of the Japanese Laid-open Patent Publication No. Hei-10 (1998)-322934.

The official gazette of the Japanese Laid-open Patent Publication No. 2005-6398.

However, to clamp the DC voltage that is input to the power circuit to the predetermined voltage, in the overvoltage protection circuit, a portion of micro energy generated by the AC power source is discarded to the ground etc. without being used. This deteriorates power generation efficiency. In particular, because the energy harvesting generates micro energy, it is undesirable to discard the generated energy without being used.

SUMMARY

According to an aspect of the embodiments, A power circuit includes: an input terminal configured to input an input current; an input capacitor coupled to the input terminal and configured to accumulate electric charge by the input current; an overvoltage protection circuit coupled to the input terminal and configured to perform clamp operation to clamp a voltage of the input terminal to a clamp voltage; a first switch and a second switch coupled in series between the input terminal and a reference power source; an inductor disposed between a first connection node located between the first switch and the second switch and an output terminal; a main output capacitor coupled to the output terminal; a main output switch disposed between the inductor and the output terminal; a sub-output capacitor coupled to a second connection node located between the inductor and the main output switch through a sub-output switch; and a control circuit coupled to the input terminal and configured to control the first switch, the second switch, the main output switch and the sub-output switch, wherein the control circuit performs: switching operation that repeats on-off and off-on control upon the first switch and the second switch, performed when voltage of the input terminal reaches a first voltage lower than the clamp voltage, until voltage of the second connection node reaches a second voltage, and suspension operation that maintains an off-state of the first switch and the second switch after the voltage of the second connection node reaches the second voltage; the switching operation and the suspension operation on the main output capacitor by switching ON the main output switch; the switching operation on the sub-output capacitor by switching OFF the main output switch and switching ON the sub-output switch, when the input terminal voltage reaches the clamp voltage during a period of the suspension operation on the main output capacitor; and the switching operation or the suspension operation on the main output capacitor and the sub-output capacitor by switching ON the main output switch and the sub-output switch, after the voltage of the second connection node reaches the second voltage by the switching operation on the sub-output capacitor.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 5 is a diagram illustrating a truth table of the output destination switch circuit according to the first embodiment;

DESCRIPTION OF EMBODIMENTS

Hereafter, preferred embodiments of the present invention will be described by reference to the accompanied drawings.

Figure 1:
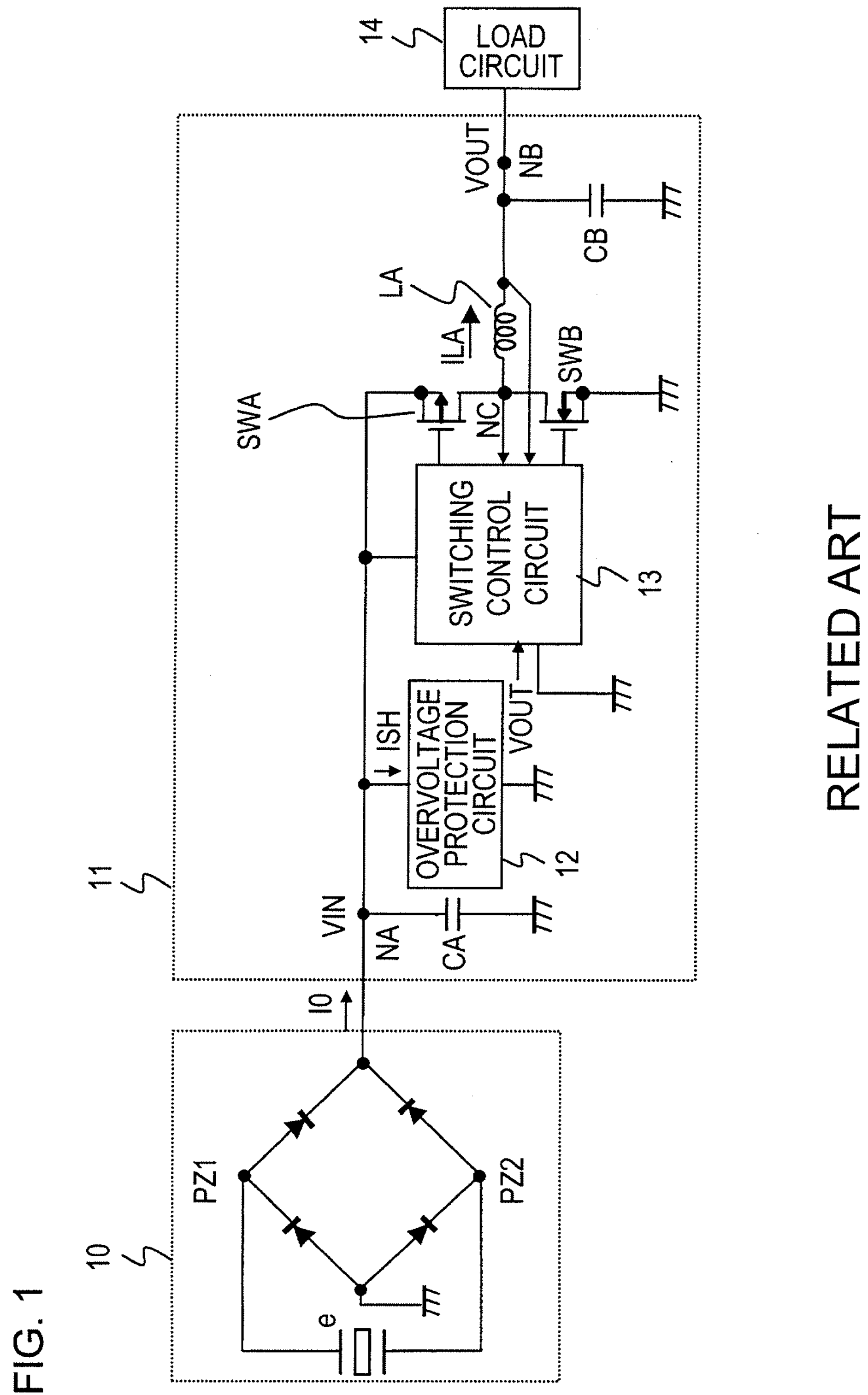
FIG. 1 is a diagram illustrating a power circuit.

FIG. 1 is a diagram illustrating a power circuit. A power circuit 11 in FIG. 1 includes: an input capacitor CA connected to an input terminal NA; an overvoltage protection circuit 12; a P-channel MOSFET switch SWA and an N-channel MOSFET switch SWB that are connected in series between the input terminal NA and the ground; an inductor LA connected between a connection node NC of the switches SWA and SWB and an output terminal NB; an output capacitor CB connected to the output terminal NB; and a switching control circuit 13 which controls the switches SWA and SWB. The power circuit 11 inputs to the input terminal NA a DC current I0 obtained by rectifying an AC power source (e) by a bridge rectifier circuit 10, and generates on the output terminal NB a desired output voltage VOUT from an input voltage VIN of the input terminal NA. The power circuit 11 then supplies the output voltage VOUT from the output terminal NB to a load circuit 14.

As the AC power source (e), energy harvesting means including vibration power generation and wireless power feed are used. For example, when a piezoelectric device is used as the AC power source (e), faint vibration energy applied to the piezoelectric device is converted into electric energy, so that an AC voltage is generated at nodes PZ1 and PZ2.

The switching control circuit 13 controls the switches SWA and SWB to switch on and off, based on the input voltage VIN of the input terminal NA, the output voltage VOUT of the output terminal NB and a current ILA flowing the inductor LA.

As the switch SWB, it may also be possible to use a diode having a forward direction from the ground to the connection node NC. In this case, as will be described later, the switching control circuit 13 may generate the output voltage VOUT by controlling the switch SWA to switch on and off.

As a typical example of the operation of the power circuit 11, there will be given a description on the operation when power generation by the AC power source (e) is performed from a state that the input voltage VIN is zero voltage when the load circuit 14 is in a standby state (a light load or no load condition). When the input voltage VIN is zero voltage, the switching control circuit 13 switches off the switches SWA and SWB. At this time, if power generation is made at the AC power source (e), the DC current I0 is input to the input terminal NA, and thus, electric charge is charged to the input capacitor CA, so that the input voltage VIN increases.

When the input voltage VIN reaches a control start voltage V0, the switching control circuit 13 switches on the switch SWA to make it conductive, and switches off the switch SWB to make it non-conductive. Hereinafter, this is referred as on-off control. By this, the connection node NC increases to the input voltage VIN and the inductor current ILA gradually increases. By this inductor current ILA, the electric charge having been charged in the input capacitor CA is transferred to the output capacitor CB.

After the lapse of a predetermined time, the switching control circuit 13 switches off the switch SWA to make it non-conductive, and switches on the switch SWB to make it conductive. Hereinafter, this is referred as off-on control. By this, the connection node NC decreases to a lower voltage than the ground voltage, and the inductor LA continues to make the inductor current ILA flow to the forward direction, so that charging to the output capacitor CB continues. However, the inductor current ILA gradually decreases. Then, when the inductor current ILA becomes zero, the switching control circuit 13 switches off the switch SWB, so as to prevent a flow of the inductor current ILA to the backward direction.

By such on-off and off-on control by the switching control circuit 13, the electric charge in the input capacitor CA is transferred to the output capacitor CB, and the input voltage VIN of the input terminal NA decreases. By this, the switching control circuit 13 suspends the on-off and off-on control, and switches off both switches SWA and SWB.

On the other hand, during the suspension of the on-off and off-on control, the decreased input voltage VIN increases again by the continuation of charging of the electric charge to the input capacitor CA by the AC power source (e). Then, when the input voltage VIN reaches the control start voltage V0 again, the switching control circuit 13 switches on the switch SWA and also switches off the switch SWB, and thereafter switches off the switch SWA and switches on the switch SWB, so that electric charge is charged to the output capacitor CB.

In such a manner, by the repetition of the above-mentioned control upon the switches SWA and SWB by the switching control circuit 13, the electric charge is charged to the output capacitor CB and the output voltage VOUT having desired potential is generated at the output terminal NB. If the capacity of the output capacitor CB is small, a time needed to generate the output voltage VOUT of the desired potential becomes short, and the load circuit 14 may be put into a usable state earlier.

When the output voltage VOUT reaches the desired potential, in order to protect the load circuit, the switching control circuit 13 suspends the on-off and off-on control and switches off both switches SWA and SWB. As a result, electric charge is continued to be charged to the input capacitor CA, and the input voltage VIN further increases to exceed the control start voltage V0.

When the input voltage VIN reaches a clamp voltage Vth that is higher than the control start voltage V0, the overvoltage protection circuit 12 starts clamp operation. The overvoltage protection circuit 12 clamps the input voltage VIN to the clamp voltage Vth that is lower than the rated voltage of the load circuit 14.

Also, when the load circuit 14 becomes an overload state, causing the output voltage VOUT of the output terminal NB decreased to be lower than the desired voltage, the power circuit 11 restarts the above-mentioned on-to-off and off-on control upon the switches SWA and SWB, to generate the output voltage VOUT of the desired voltage.

As such, the power circuit 11 performs switching operation to generate the output voltage VOUT of the desired voltage by the on-off and off-on control upon the switches SWA and SWB. And also, after the output voltage VOUT reaches the desired voltage, the power circuit 11 performs suspension operation to maintain the switches SWA and SWB off.

Figure 2:
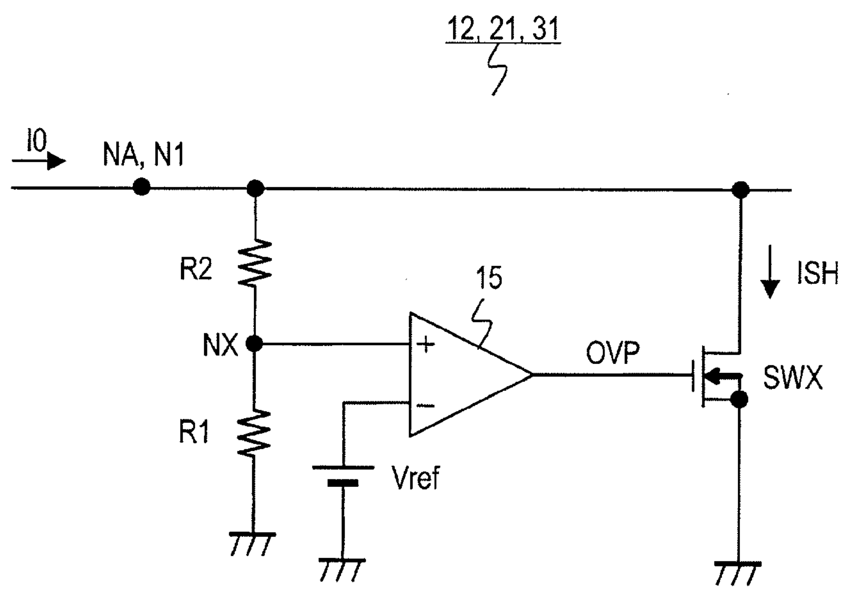
FIG. 2 is a diagram illustrating the overvoltage protection circuit.

FIG. 2 is a diagram illustrating the overvoltage protection circuit. The overvoltage protection circuit 12 depicted in FIG. 2 includes resistors R1 and R2 connected in series between the input terminal NA and the ground, a comparator 15 and a switch SWX of an N-channel MOSFET. To the plus terminal of the comparator 15, a connection node NX between the resistor R1 and the resistor R2 is connected. To the minus terminal, a voltage Vref=Vth*R1/(R1+R2) is supplied. Based on the comparison result, an overvoltage detection signal OVP is supplied to the switch SWX.

When the input voltage VIN reaches the clamp voltage Vth, the connection node NX becomes the voltage Vref or higher, and therefore, the comparator 15 outputs an low level overvoltage detection signal OVP to switch on the switch SWX. By the conduction of the switch SWX, a current ISH flows from the input terminal NA to the ground through the switch SWX. As a result, the overvoltage protection circuit 12 clamps the input voltage VIN to the clamp voltage Vth.

Thus, when the clamp operation is performed in the overvoltage protection circuit 12, undesirably the current ISH flows to the ground without being used in the power circuit 11. In other words, a portion of micro power out of the power generated in the AC power source is discarded without being used, causing deteriorated power generation efficiency. In particular, since power generated by an energy harvesting device such as a piezoelectric device is faint, desirably the generated power may be used to the maximum. Accordingly, in the following, there is described a power circuit with improved power generation efficiency by the use of the current ISH of the overvoltage protection circuit 12.

First Embodiment

Figure 3:
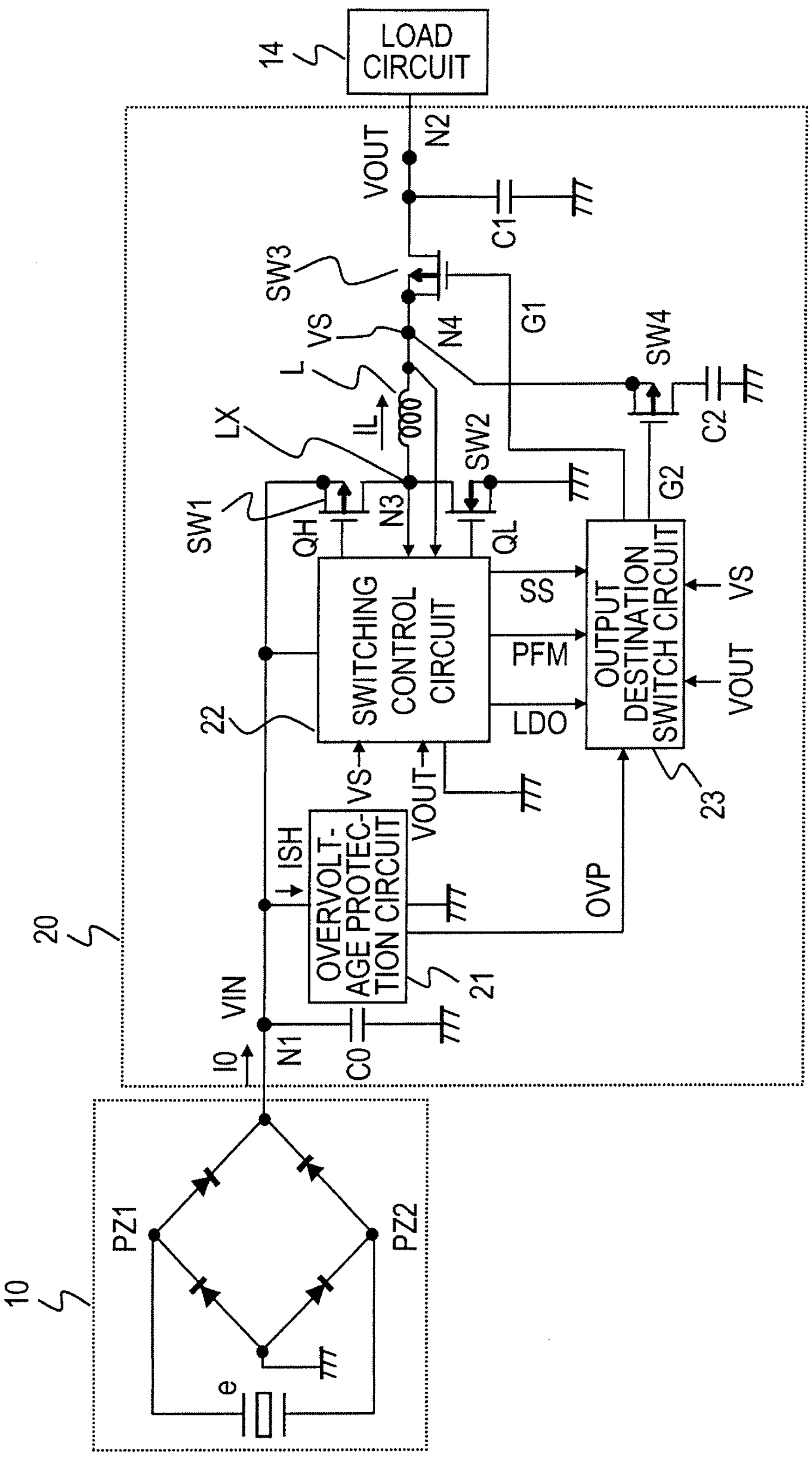
FIG. 3 is a diagram illustrating a power circuit according to a first embodiment.

FIG. 3 is a diagram illustrating a power circuit according to a first embodiment. In addition to the power circuit 11 depicted in FIG. 1, a power circuit 20 depicted in FIG. 3 further includes: a main output switch SW3 of a P-channel MOSFET disposed between an inductor L and an output terminal N2; a sub-capacitor C2 connected to a node N4 between the main output switch SW3 and the inductor L, through a sub-output switch SW4 of a P-channel MOSFET; and an output destination switch circuit 23 which controls the main output switch SW3 and the sub-output switch SW4. Further, similar to FIG. 1, the power circuit 20 inputs to an input terminal N1 a DC current I0 rectified by a bridge rectifier circuit 10. As will be described later, the power circuit 20 charges the main output capacitor C1 and the sub-output capacitor C2 by the control of the switches SW1-SW4, and generates an output voltage VOUT to the output terminal N2, to supply an output voltage VOUT to a load circuit 14.

The power circuit 20 is configured in a single chip, excluding the input capacitor C0, the main output capacitor C1, the sub-output capacitor C2 and the inductor L. The bridge rectifier circuit 10, the input capacitor C0, the main output capacitor C1, the sub-output capacitor C2 and the inductor L are provided externally. Alternatively, the power circuit 20 may be configured entirely in a single chip, including the input capacitor C0, the main output capacitor C1, the sub-output capacitor C2 and the inductor L. Further, there may be a case of forming a MEMS device including the power circuit 20 and the bridge rectifier circuit 10 that are integrated on a single silicon base plate.

The overvoltage protection circuit 21 includes a similar configuration to that depicted in FIG. 2. When an input voltage VIN at the input terminal N1 reaches a clamp voltage Vth, the above-mentioned clamp operation is performed, and also, an overvoltage detection signal OVP output from a comparator 15 is supplied to the output destination switch circuit 23.

A switching control circuit 22 outputs a drive signal QH to control the switch SW1 and a drive signal QL to control the switch SW2, based on an input voltage VIN at the input terminal N1, the output voltage VOUT at the output terminal N2, a voltage VS at the node N4 and the inductor current IL in the inductor L. Also, the switching control circuit 22 supplies to the output destination switch circuit 23 a power voltage LDO, an output voltage detection signal SS and a suspension signal PFM described later.

To the output destination switch circuit 23, the power voltage LDO is supplied from the switching control circuit 22. Based on the output voltage VOUT, the voltage VS at the node N3 and the overvoltage detection signal OVP, the output voltage detection signal SS and the suspension signal PFM, the output destination switch circuit 23 outputs a drive signal G1 to control the main output switch SW3 and a drive signal G2 to control the sub-output switch SW4.

Figure 4:
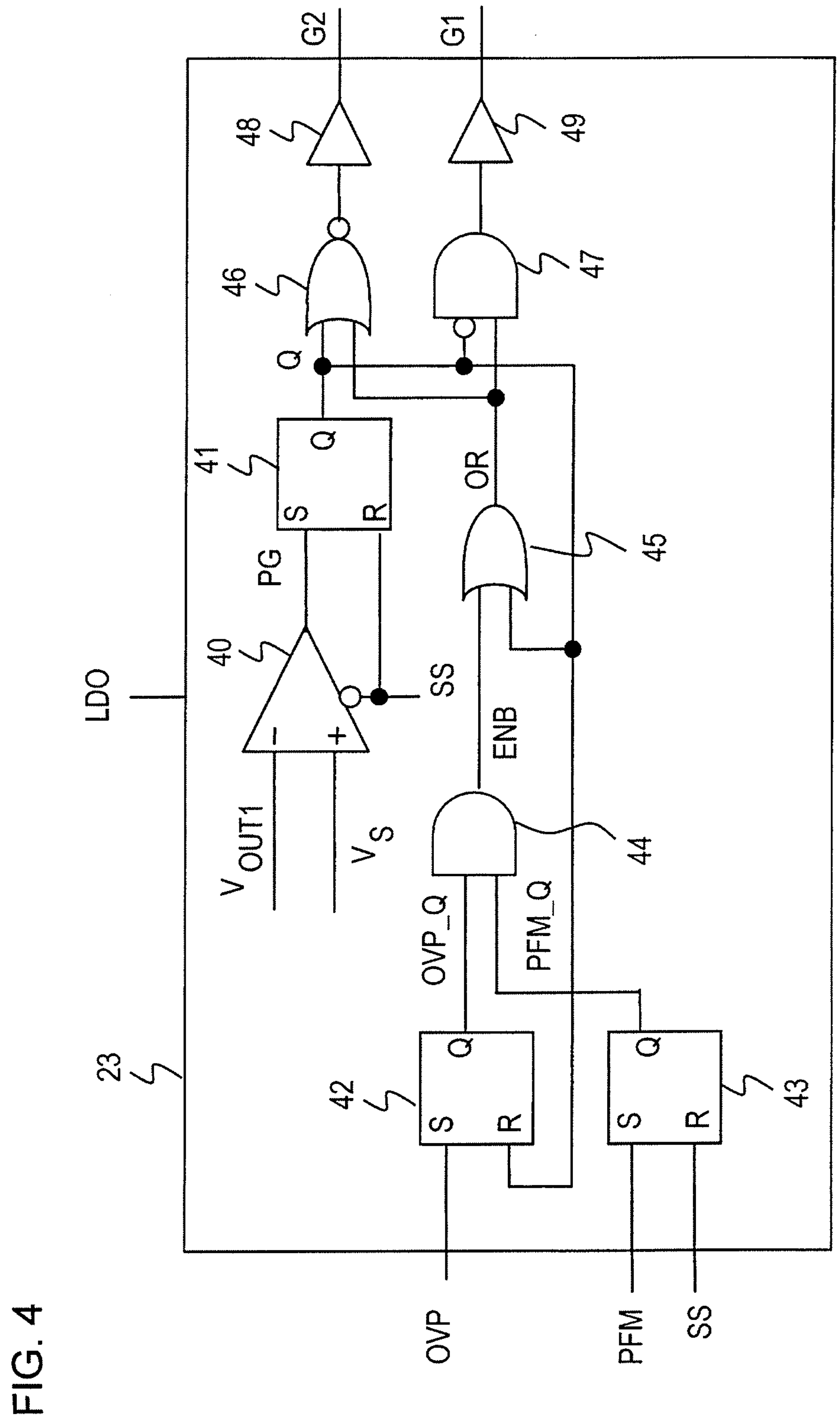
FIG. 4 is a diagram illustrating the output destination switch circuit according to the first embodiment.

FIG. 4 is a diagram illustrating the output destination switch circuit according to the first embodiment. Also, FIG. 5 is a diagram illustrating a truth table of the output destination switch circuit according to the first embodiment.

The output destination switch circuit 23 depicted in FIG. 4 includes a comparator 40, RS flip-flops 41-43, an AND gate 44, an AND gate 47, an OR gate 45, a NOR gate 46, a buffer 48 and a buffer 49.

The comparator 40 inputs the output voltage detection signal SS as an enable signal, and compares the output voltage VOUT with the voltage VS of the node N3, so as to output a charge completion signal PG. Also, the RS flip-flop 41 inputs the output signal PG of the comparator 40 to a set input terminal and the output voltage detection signal SS to a reset input terminal, respectively, and outputs an output signal Q.

Also, the RS flip-flop 42 inputs the overvoltage detection signal OVP to a set input terminal and the output voltage detection signal SS to a reset input terminal, respectively, and outputs an output signal OVP_Q. Further, the RS flip-flop 43 inputs the suspension signal PFM to a set input terminal and the output voltage detection signal SS to a reset terminal, respectively, and outputs an output signal PFM_Q.

The AND gate 44 inputs the output signal OVP_Q of the RS flip-flop 42 and the output signal PFM_Q of the RS flip-flop 43, and outputs an output signal ENB. The OR gate 45 inputs the output signal ENB of the AND gate 44 and the output signal Q of the RS flip-flop 41, and outputs an output signal OR.

Further, based on the output signals Q and OR, the NOR gate 46 outputs a drive signal G2 of the sub-output switch SW4 through the buffers 48. And, based on the output signals Q and OR, the AND gate 47 outputs a drive signal G1 of the main output switch SW3 through the buffers 49.

Figure 6:
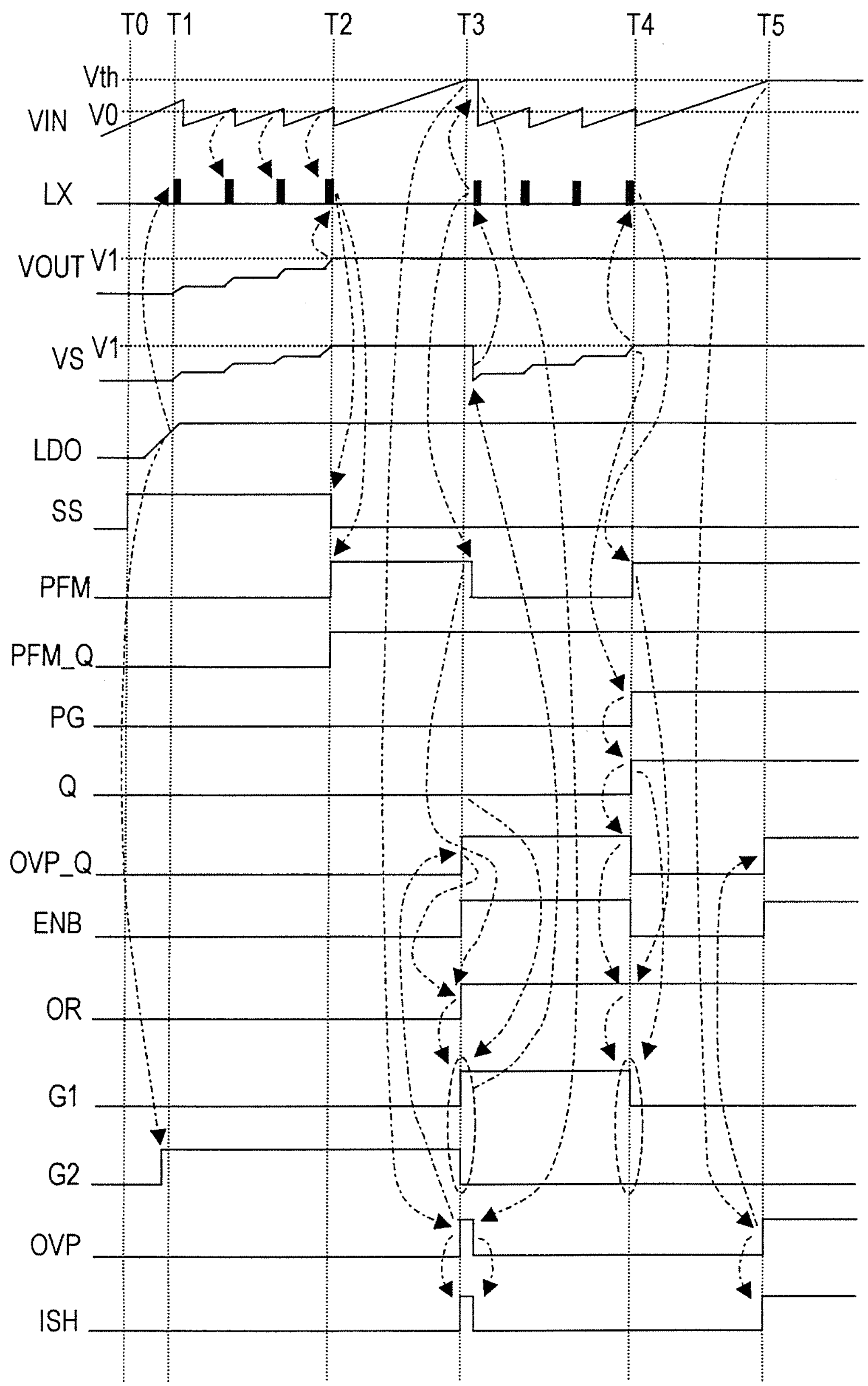
FIG. 6 is a diagram illustrating an output voltage and each signal generated by the power circuit according to the first embodiment.

Next, concrete operation of the power circuit 20 will be described by reference to FIG. 6. FIG. 6 is a diagram illustrating an output voltage and each signal generated by the power circuit according to the first embodiment. FIG. 6 illustrates operation waveforms when the AC power source (e) starts power generation in such a state that the load circuit 14 is in no load or a light load condition, the switches SW1 and SW2 are switched off and the output voltage VOUT is zero voltage.

When the AC power source (e) starts power generation, electric charge is charged to the capacitor C0, and the input voltage VIN increases. At a time T0, when the input voltage VIN reaches an initiation voltage, the switching control circuit 22 starts raising the power voltage LDO, and sets the output voltage detection signal SS to the high level. Also, the output destination switch circuit 23, supplied with the power voltage LDO, sets the drive signal G2 to the high level to switch off the sub-output switch SW4, and maintains the drive signal G1 at the low level to switch on the main output switch SW3.

At a time T1 when the power voltage LDO increases to a predetermined voltage, if the input voltage VIN has reached the control start voltage V0, the switching control circuit 22 starts the aforementioned switching operation to generate the output voltage VOUT. Here, the state of each signal in the output destination switch circuit 23 at the time T1 is as depicted in the record A of FIG. 5.

Figure 7:
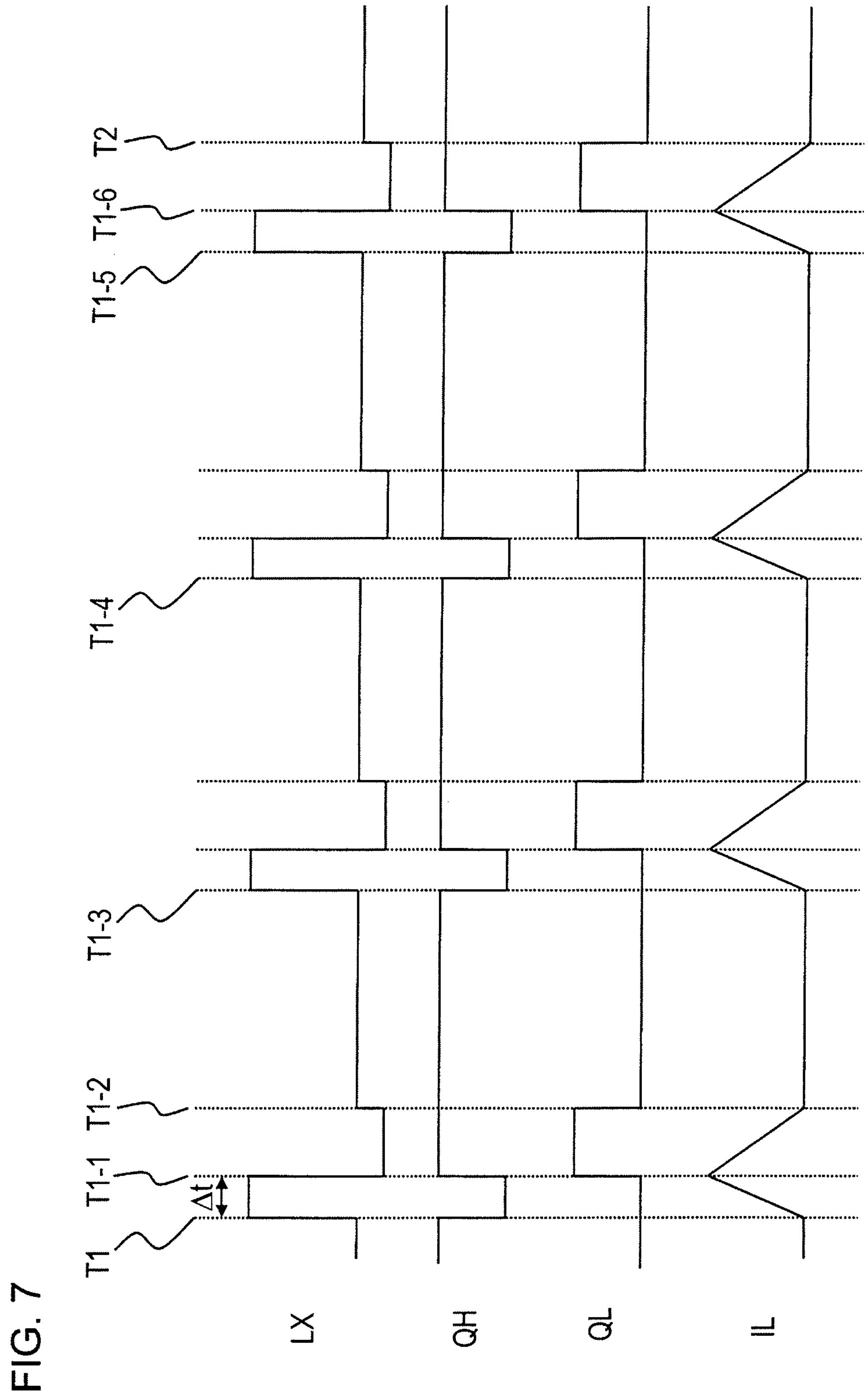
FIG. 7 is a diagram illustrating the waveform of the drive signals that are output from the switching control circuit according to the first embodiment.

A waveform LX depicted in FIG. 6 illustrates the occurrence of voltage fluctuation at the connection node N3. During a period from the time T1 when the switching control circuit 22 starts the switching operation to a time T2 when the output voltage VOUT of a desired voltage V1 is generated, as will be described later, as will be described later, the switching control circuit 22 intermittently repeats on-off and off-on control upon the switches SW1 and SW2. In FIG. 7, there are depicted the drive signal QH of the switch SW1, the drive signal QL of the switch SW2, and the inductor current IL that correspond to the voltage LX at the connection node N3, from the time T1 to the time T2 depicted in FIG. 6.

FIG. 7 is a diagram illustrating the waveform of the drive signals that are output from the switching control circuit according to the first embodiment. Hereafter, the operation of the switches SW1 and SW2 from the time T1 to the time T2 will be concretely described using FIG. 7.

At the time T1, the input voltage VIN has reached the control start voltage V0, and therefore, the switching control circuit 22 sets the drive signal QH to the low level to switch on the switch SW1, and maintains the drive signal QL at the low level to switch off the switch SW2. Hereinafter, this is referred as on-off control. By this, the voltage LX at the connection node N3 increases to the input voltage VIN, and the inductor current IL gradually increases. Further, by the inductor current IL, electric charge is transferred from the input capacitor C0 to the main output capacitor C1. As a result, the input voltage VIN decreases, whereas the output voltage VOUT and the voltage VS at the node N4 increase.

At a time T1-1 after the lapse of a time ΔT from the time T1, the switching control circuit 22 sets the drive signal QH to the high level to switch off the switch SW1, and also sets the drive signal QL to the high level to switch on the switch SW2. Hereinafter, this is referred as off-on control. By this, the voltage LX at the connection node N3 decreases to a voltage lower than the ground voltage, and the inductor L continues the flow of the inductor current IL to the main output capacitor C1 through the node N4 by the stored electromagnetic energy, to continue charging to the main output capacitor C1. However, the inductor current IL gradually decreases.

At a time T1-2 when the inductor current IL becomes zero, the switching control circuit 22 switches off the switch SW2, to prevent the inductor current IL from flowing to the ground through the connection node N3. Further, because the input voltage VIN decreases to a voltage lower than the control start voltage V0, the switching control circuit 22 completes the on-off and off-on control upon the switches SW1 and SW2, and switches off the switches SW1 and SW2. By this, electric charge continues to be charged to the input capacitor C0, so that the input voltage V1 increases again.

At a time T1-3 when the input voltage VIN reaches the control start voltage V0, the switching control circuit 22 performs on-off and off-on control upon the switches SW1 and SW2 similarly as from the time T1 to the time T1-2, so that the electric charge is transferred from the capacitor C0 to the capacitor C1. Further, at a time T1-4 when the input voltage VIN reaches the control start voltage V0 again by the above operation, the switching control circuit 22 performs on-off and off-on control upon the switches SW1 and SW2, similarly as from the time T1 to the time T1-2.

As such, each time the input voltage VIN reaches the control start voltage V0, electric charge is charged to the main output capacitor C1, so that the output voltage VOUT and the voltage VS increase.

At a time T1-6, when the output voltage VOUT and the voltage VS reach the desired voltage V1, the switching control circuit 22 sets the drive signal QH from the low level to the high level to switch off the switch SW1, and also sets the drive signal QL from the low level to the high level to switch on the switch SW2. Then, at the time T2 when the inductor current IL becomes zero, the switching control circuit 22 sets the drive signal QL to the low level to switch off the switch SW2, and starts suspension operation.

Thus, the switching control circuit 22 performs switching operation that intermittently repeats the on-off and off-on control upon the switches SW1 and SW2 during the time T1 to the time T2, and generates the output voltage VOUT that reaches the desired voltage V1.

Referring back to FIG. 6, in response to the output voltage VOUT and the voltage VS reaching the desired voltage V1 at the above-mentioned time T1-6, when starting the suspension operation at the time T2, the switching control circuit 22 sets the output voltage detection signal SS from the high level to the low level. At the same time, the switching control circuit 22 sets the suspension signal PFM from the low level to the high level. In response to the low level output voltage detection signal SS and an high level suspension signal PFM, the RS flip-flop 43 in the output destination switch circuit 23 outputs an high level output signal PFM_Q (record F in FIG. 5).

By the suspension operation of the switching control circuit 22 from the time T2, electric charge is charged to the input capacitor C0, so that the input voltage VIN increases. At a time T3 when the input voltage VIN reaches the clamp voltage Vth higher than the control start voltage V0, the comparator 15 in the overvoltage protection circuit 21 outputs an high level overvoltage detection signal OVP, so as to switch on the switch SWX. By this, the clamp current ISH flows from the input terminal N1 to the ground through the switch SWX, and the input voltage VIN is clamped to the clamp voltage Vth.

On the other hand, in the output destination switch circuit 23, in response to the high level overvoltage detection signal OVP and the low level output signal Q, the RS flip-flop 42 outputs an high level output signal OVP_Q. In response to the above high level output signal OVP_Q and the high level suspension signal PFM, the AND gate 44 outputs an high level output signal ENE. Further, in response to the high level output signal ENE and the low level output signal Q, the OR gate 45 outputs an high level output signal OR. Then, in response to the low level output signal Q and the high level output signal OR, the NOR gate 46 switches the drive signal G2 from the high level to the low level. And the AND gate 47 switches the drive signal G1 from the low level to the high level (record H in FIG. 5). By this, the main output switch SW3 is switched off and the sub-output switch SW4 is switched on, and the voltage VS at the node N4 is decreased by the sub-output capacitor C2.

On detecting that the voltage VS at the node N4 is lower than the desired voltage V1 and the input voltage VIN is higher than the control start voltage V0, the switching control circuit 22 switches the suspension signal PFM from the high level to the low level, so as to complete the suspension operation and start the switching operation of the switches SW1 and SW2. By this, electric charge is charged to the sub-output capacitor C2, and the voltage VS at the node N4 increases. Further, when the switching control circuit 22 starts the switching operation of the switches SW1 and SW2, because the input voltage VIN decreases from the clamp voltage Vth, the overvoltage protection circuit 21 sets the overvoltage detection signal OVP to the low level to switch off the switch SWX.

At a time T4 when the voltage VS at the node N4 reaches the desired voltage V1, the switching control circuit 22 completes the switching operation of the switches SW1 and SW2 and starts the suspension operation, so as to set the suspension signal PFM to the high level, similarly to the time T2. Then, the output destination switch circuit 23 sets the drive signal G1 from the high level to the low level by the high level suspension signal PFM, the low level output voltage detection signal SS, the overvoltage detection signal OVP and the output voltage VOUT and the voltage VS at the node N4 having reached the desired voltage V1. The output destination switch circuit 23 also maintains the drive signal G2 at the high level (record K in FIG. 5). Namely, the output destination switch circuit 23 switches on both the main output switch SW3 and the sub-output switch SW4. By this, the sub-output capacitor C2 functions as a power stabilization capacitor together with the main output capacitor C1. Thus, it is possible to supply the output voltage VOUT of the desired voltage V1 to the load circuit 14 with stable potential.

From the time T4, electric charge continues to be charged to the input capacitor C0, and therefore the input voltage VIN increases again. Then, at a time T5 when the input voltage VIN reaches the clamp voltage Vth, the overvoltage protection circuit 21 switches on the switch SWX again, and clamps the input voltage VIN to the clamp voltage Vth. Additionally, each signal state of the output destination switch circuit 23 is as illustrated in record I of FIG. 5.

Additionally, at the time T4 and thereafter, if the load circuit 14 is changed to a heavy load condition, because the electric charges stored in the main output capacitor C1 and the sub-output capacitor C2 are supplied to the load circuit 14, the output voltage VOUT and the voltage VS at the node N4 decrease. On detecting this, the switching control circuit 22 starts the switching operation and maintains the output voltage VOUT at the desired voltage V1.

As such, according to the first embodiment, when the load circuit 14 is in no load or a light load condition, after the charge to the output capacitor C0 is completed, it is possible to charge power generated by the AC power source (e) without discard, by switching the charging target to the sub-output capacitor C2. Also, by the reduction of the capacitance of the main output capacitor C1, it is possible to promptly generate the output voltage VOUT of the desired voltage V1 after the start of the power generation by the AC power source (e). Further, by the increase of the sub-output capacitor C2, it is possible to suppress the fluctuation of the output voltage if the load condition of the load circuit 14 is abruptly changed after the completion of the charge to the sub-output capacitor C2, by the function of the sub-output capacitor C2 as a power stabilization capacitor.

Additionally, according to the first embodiment, in response to the overvoltage detection signal OVP switched from the low level to the high level, the switches SW3 and SW4 are switched to start the switching operation of the switches SW1 and SW2 in the switching control circuit 22. However, it is not limited thereto. For example, the switching control circuit 22 may start the switching operation of the switches SW1 and SW2 by switching the switches SW3 and SW4 in response to the input voltage reaching the control start voltage V0 while the switching control circuit 22 is in the suspension operation.

Second Embodiment

Figure 8:
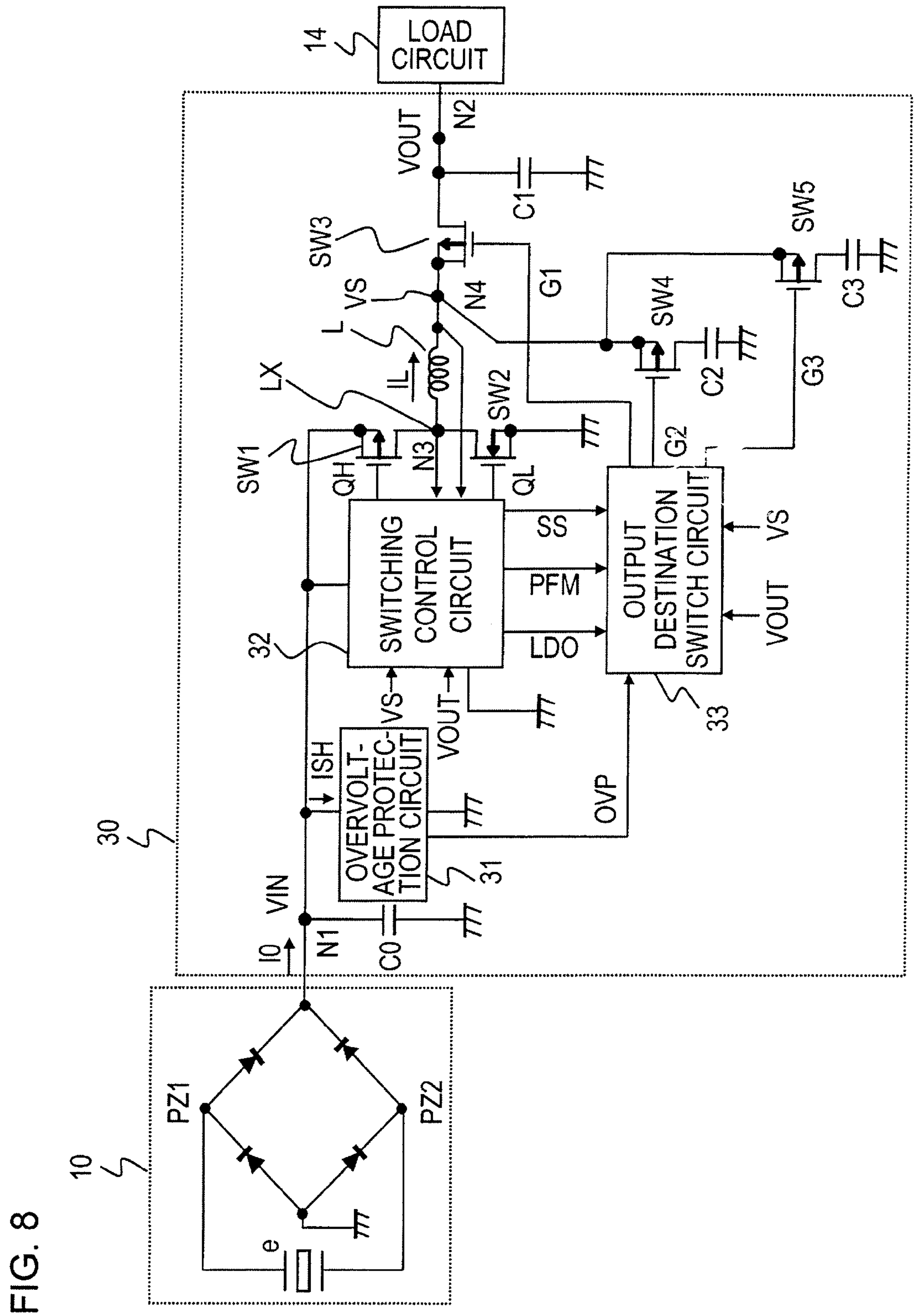
FIG. 8 is a diagram illustrating a power circuit according to a second embodiment.

FIG. 8 is a diagram illustrating a power circuit according to a second embodiment. In addition to the power circuit 20 depicted in FIG. 3, the power circuit 30 depicted in FIG. 8 further includes an external sub-output capacitor C3 connected to a node N4 through a sub-output switch SW5 of a P-channel MOSFET, in parallel to a sub-output capacitor C2. Alternatively, instead of external attachment, the sub-output switch SW5 may be configured in a single chip together with other elements of the power circuit 30. The sub-output switch SW5 is controlled by a drive signal G3 output from an output destination switch circuit 33.

Figure 9:
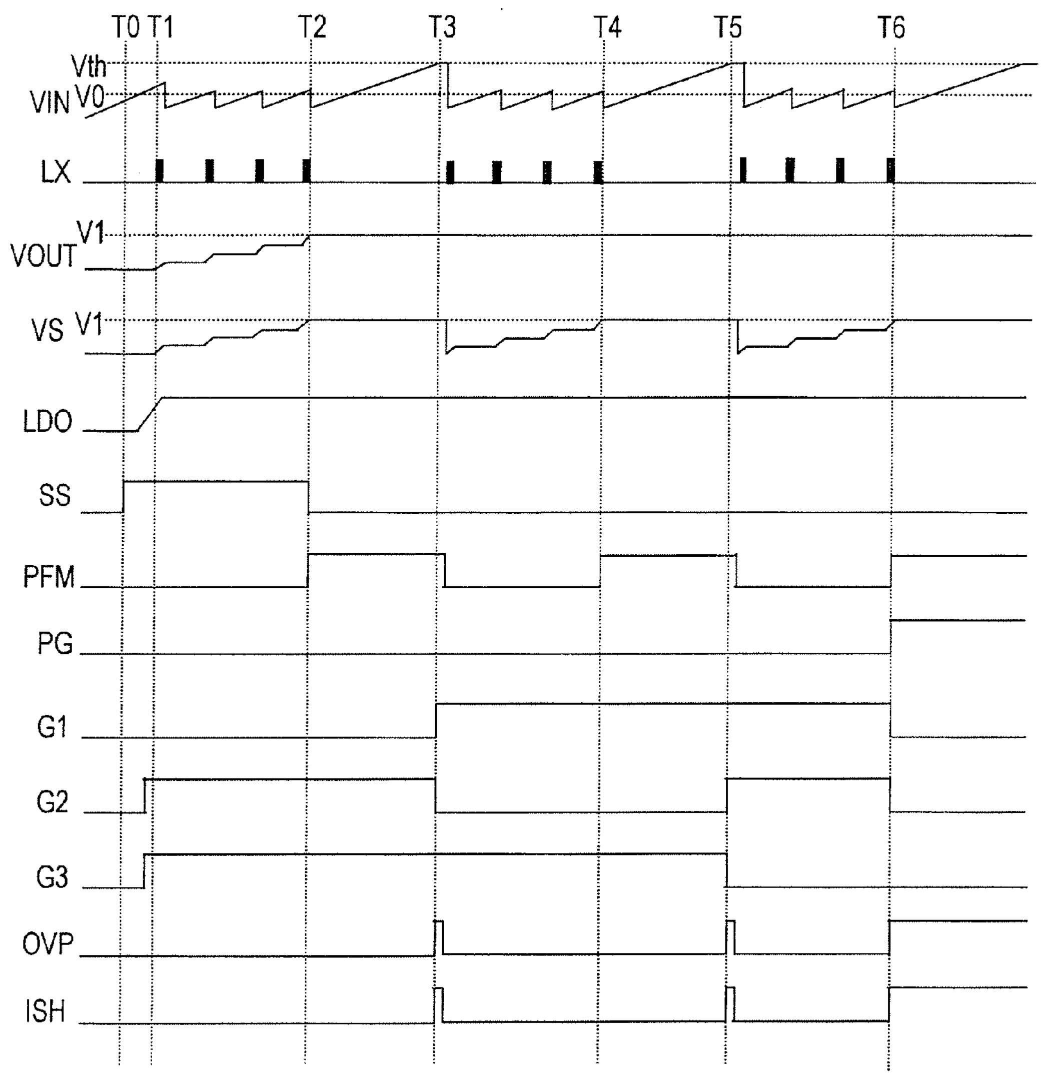
FIG. 9 is a diagram illustrating an output voltage and each signal waveform generated by the power circuit according to the second embodiment.

By reference to FIG. 9, there will be described typical operation when two sub-output capacitors are provided as power stabilization capacitors, as depicted in FIG. 8. FIG. 9 is a diagram illustrating an output voltage and each signal waveform generated by the power circuit according to the second embodiment. FIG. 9 illustrates operation waveforms when the AC power source (e) starts power generation in such a state that a load circuit 14 is in no load or a light load condition, switches SW1 and SW2 are switched off, and an output voltage VOUT is zero voltage.

At a time T0, when an input voltage VIN reaches an initiation voltage, a switching control circuit 32 starts raising a power voltage LDO, and sets an output voltage detection signal SS to the high level. Also, the output destination switch circuit 33, supplied with the power voltage LDO, sets drive signals G2 and G3 to the high level to switch off sub-output switches SW4 and SW5, and maintains a drive signal G1 at the low level to switch on a main output switch SW3.

Then, similar to the first embodiment, from a time T1 when the power voltage LDO increases to a predetermined voltage to a time T4, the switching control circuit 32 performs switching operation and suspension operation of the switches SW1 and SW2, and the output destination switch circuit 33 controls the main output switch SW3 and the sub-output switch SW4. As a result, electric charge corresponding to a desired voltage V1 is charged to a main output capacitor C1 and the sub-output capacitor C2.

At the time T4, in response to a voltage VS at the node N4 has reached the desired voltage V1, the switching control circuit 32 starts suspension action and sets a suspension signal PFM from the low level to the high level. By this, the input voltage VIN increases again. At a time T5 when the input voltage VIN has reached a clamp voltage Vth higher than a control start voltage V0, the comparator 15 in an overvoltage protection circuit 31 outputs an high level overvoltage detection signal OVP, to switch on the switch SWX. By this, a clamp current ISH flows from the input terminal through a main output switch SW3, and the input voltage VIN is clamped to the clamp voltage Vth.

Then, in response to the above high level overvoltage detection signal OVP, the output destination switch circuit 33 sets the drive signal G2 from the low level to the high level, and also sets the drive signal G3 from the high level to the low level. By this, the sub-output switch SW4 is switched off, the sub-output switch SW5 is switched on, so that the voltage VS at the node N4 decreases.

On detecting that the voltage VS at the node N4 is lower than the voltage V1 and the input voltage VIN is higher than the control start voltage V0, the switching control circuit 32 sets the suspension signal PFM from the high level to the low level, to complete suspension operation and start switching operation. By this, electric charge is charged to the sub-output capacitor C3, and the voltage VS at the node N4 increases.

At a time T6, when the voltage VS at the node N4 reaches the desired voltage V1, the switching control circuit 32 completes the switching operation and starts the suspension operation, and sets the suspension signal PFM to the high level. Then, by the high level suspension signal PFM, the low level output voltage detection signal SS, the overvoltage detection signal OVP and an output voltage VOUT and the voltage VS at the node N4 having reached the desired voltage V1, the output destination switch circuit 33 sets the drive signals G1 and G2 from the high level to the low level, and maintains the drive signal G3 at the low level. Namely, the output destination switch circuit 33 switches on the main output switch SW3 and the sub-output switches SW4, SW5.

By this, together with the main output capacitor C1, the sub-output capacitors C2 and C3 can supply to the load circuit 14 the output voltage VOUT having the desired voltage V1, as power stabilization capacitors.

From the time T6, similar to the first embodiment, the input voltage VIN increases again because electric charge continues to be charged to the input capacitor C0. Then, when the input voltage VIN reaches the clamp voltage Vth, the overvoltage protection circuit 31 clamps the input voltage VIN to the clamp voltage Vth.

Further, at the time T6 and thereafter, if the load circuit 14 is changed to a heavy load condition, on detection of a decrease of the output voltage VOUT and a decrease of the voltage VS at the node N4, the switching control circuit 32 starts the switching operation, and maintains the output voltage VOUT at the desired voltage V1, similar to the first embodiment.

As such, in FIG. 9, when the load circuit 14 is in no load or a light load condition, after the completion of charging the main output capacitor C1, the sub-capacitors C2 and C3 are charged successively by the switchover operation of the sub-output switch by the output destination switch circuit 33 and the switching operation and the suspension operation by the switching control circuit 32. Namely, similar to the first embodiment, even after the completion of charging the main output capacitor C1, it is possible to charge power generated by the AC power source (e) without discarding. By this, if the load condition of the load circuit 14 abruptly changes, the sub-output capacitors C2 and C3 function as power stabilization capacitors, and prevent a voltage decrease of the output voltage VOUT. Thus, it is possible to supply the output voltage VOUT to the load circuit 14 in a more stable manner than in the first embodiment.

Additionally, when there are three or more sub-output capacitors, a voltage increase period of the input voltage VIN by the suspension operation like a period of T2-T3 depicted in FIG. 9, and a charging period by the switching operation after switching the sub-output switches like a period of T3-T4 are repeated after the completion of charging the main output capacitor C1. As a result, each sub-output capacitor is charged to the desired voltage V1. Then, after the completion of charging, each sub-output capacitor functions as power stabilization capacitor and prevents a voltage decrease of the output voltage VOUT.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A power circuit comprising:

an input terminal configured to input an input current;

an input capacitor coupled to the input terminal and configured to accumulate electric charge by the input current;

an overvoltage protection circuit coupled to the input terminal and configured to perform clamp operation to clamp a voltage of the input terminal to a clamp voltage;

a first switch and a second switch coupled in series between the input terminal and a reference power source;

an inductor disposed between a first connection node located between the first switch and the second switch and an output terminal;

a main output capacitor coupled to the output terminal;

a main output switch disposed between the inductor and the output terminal;

a sub-output capacitor coupled to a second connection node located between the inductor and the main output switch through a sub-output switch; and a control circuit coupled to the input terminal and configured to control the first switch, the second switch, the main output switch and the sub-output switch, wherein the control circuit performs:

switching operation that repeats on-off and off-on control upon the first switch and the second switch, performed when voltage of the input terminal reaches a first voltage lower than the clamp voltage, until voltage of the second connection node reaches a second voltage, and suspension operation that maintains an off-state of the first switch and the second switch after the voltage of the second connection node reaches the second voltage;

the switching operation and the suspension operation on the main output capacitor by switching ON the main output switch;

the switching operation on the sub-output capacitor by switching OFF the main output switch and switching ON the sub-output switch, when the input terminal voltage reaches the clamp voltage during a period of the suspension operation on the main output capacitor; and the switching operation or the suspension operation on the main output capacitor and the sub-output capacitor by switching ON the main output switch and the sub-output switch, after the voltage of the second connection node reaches the second voltage by the switching operation on the sub-output capacitor.

2. The power circuit according to claim 1, wherein the input terminal inputs a direct current obtained by rectifying an alternating current output from an alternating-current power circuit.

3. The power circuit according to claim 1, wherein, in the switching operation, during a period before the voltage of the second connection node reaches the second voltage, the control circuit performs first switch operation that switches OFF the first switch and switches ON the second switch after a lapse of a predetermined time after switching ON the first switch and switching OFF the second switch when the input terminal voltage reaches the first voltage, and second switch operation that switches OFF the first switch and the second switch when a flow of the inductor current is switched from a forward direction to a backward direction.

4. The power circuit according to claim 1, wherein, when the voltage of the second connection node reaches the second voltage, the control circuit switches OFF the first switch and switches ON the second switch, and when a flow of the inductor current is changed from a forward direction to a backward direction, the control circuit switches OFF the second switch to performed the suspension operation.

5. The power supply circuit according to claim 1, wherein, when the input terminal voltage first reaches a predetermined voltage from zero voltage, the first switch and the second switch are switched OFF, the main output switch is switched ON and the sub-output switch is switched OFF.

6. The power supply circuit according to claim 1, further comprising:

a plurality of sets of the sub-output switches and the sub-output capacitors, wherein, for each sub-output capacitor, the control circuit performs the switching operation on the sub-output capacitor by switching OFF the main output switch, switching ON a sub-output switch corresponding to the sub-output capacitor, and switching OFF other sub-output switches;

a period of the suspension operation is between each period of the switching operation; and on completion of the switching operation on the entire sub-output capacitors, the control circuit performs the switching operation or the suspension operation on the main output capacitor and the sub-output capacitors by switching ON the main output switch and the sub-output switches, so that an output voltage equal to the second voltage is output from the output terminal.

7. A control circuit in a power circuit including an input terminal to input an input current, an input capacitor coupled to the input terminal to accumulate electric charge by the input current, an overvoltage protection circuit coupled to the input terminal to perform clamp operation to clamp voltage of the input terminal to a clamp voltage, a first switch and a second switch coupled in series between the input terminal and a reference power source, an inductor disposed between a first connection node, located between the first switch and the second switch, and an output terminal, a main output capacitor coupled to the output terminal, a main output switch disposed between the inductor and the output terminal, and a sub-output capacitor coupled to a second connection node located between the inductor and the main output switch through a sub-output switch, the control circuit comprising a control part coupled to the input terminal to control the first switch, the second switch, the main output switch and the sub-output switch, the control part configured to perform:

switching operation that performs on-off and off-on control upon the first switch and the second switch when voltage of the input terminal reaches a first voltage lower than the clamp voltage until voltage of the second connection node reaches a second voltage, and suspension operation that maintains an off-state of the first switch and the second switch;

the switching operation and the suspension operation on the main output capacitor by switching ON the main output switch;

the switching operation on the sub-output capacitor by switching OFF the main output switch and switching ON the sub-output switch, when the input terminal voltage reaches the clamp voltage during a period of the suspension operation on the main output capacitor; and the switching operation or the suspension operation on the main output capacitor and the sub-output capacitor by switching ON the main output switch and the sub-output switch, after the voltage of the second connection node reaches the second voltage by the switching operation on the sub-output capacitor.

* * * * *